March 10, 1936.  L. E. McDONALD  2,033,143
MULTIPLE ELECTRODE TREATER AND METHOD
Filed April 2, 1932
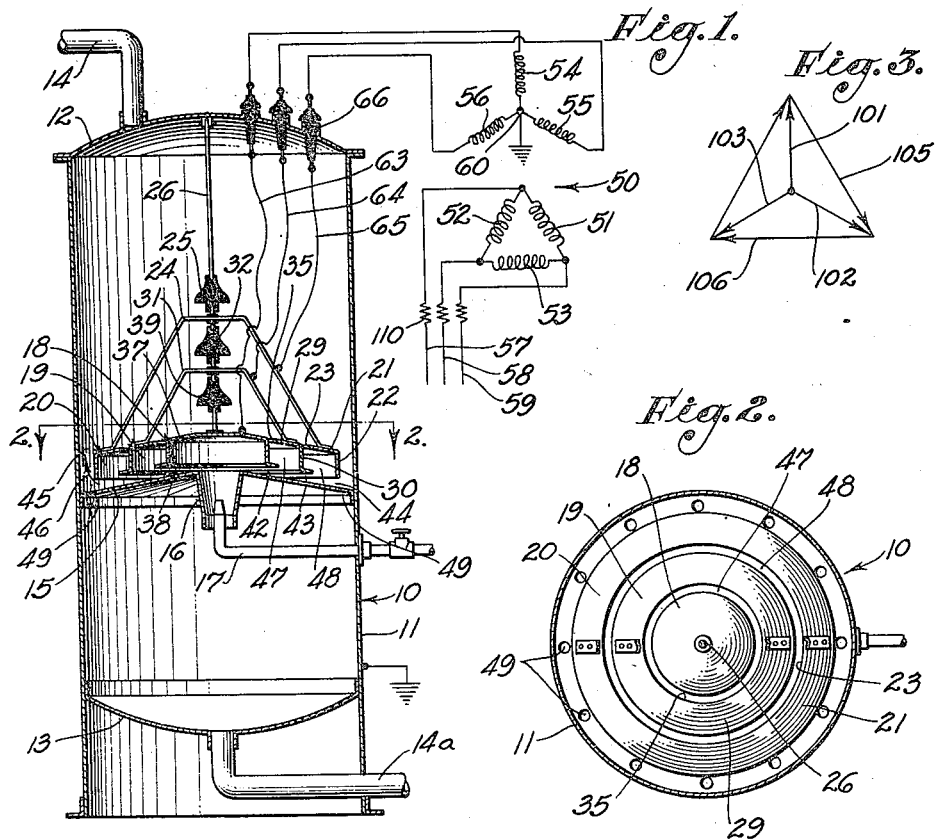
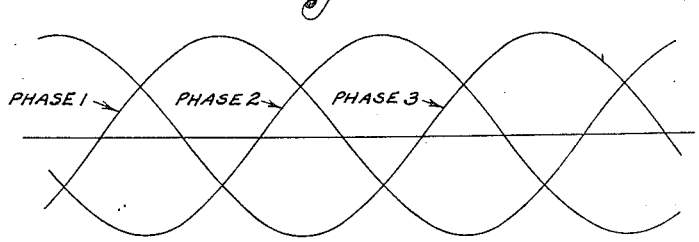
INVENTOR:
Louis E. McDonald,
BY
ATTORNEY.

Patented Mar. 10, 1936

2,033,143

UNITED STATES PATENT OFFICE 2,033,143

MULTIPLE ELECTRODE TREATER AND METHOD

Louis E. McDonald, Houston, Tex., assignor to Petroleum Rectifying Company of California, Los Angeles, Calif., a corporation Application April 2, 1932, Serial No. 602,745

15 Claims. (Cl. 204—24)

My invention relates to the electric treatment of mixtures, and more particularly to a method and apparatus for separating the phases of an emulsion. One method of treating a petroleum emulsion to separate the phases therefrom is to move this emulsion through an electric field set up by an alternating potential. The electric field agglomerates the dispersed water droplets or particles into masses of sufficient size so that they will separate from the oil upon being allowed to stand.

It has been suggested that several live electrodes might be utilized in such a manner that the potential between adjacent electrodes would be greater than the potential between the grounded tank and any of these electrodes.

There is invariably a tendency for low resistance paths to form across the fields thus set up, the emulsion particles apparently tending to arrange themselves in a minute chain extending between the electrodes. This tendency to short-circuit and ground one of the electrodes of certain systems such as set forth above acts to increase the potential between the now grounded electrode and an adjacent electrode to such an extent that almost invariably short-circuiting and grounding of the adjacent electrode takes place. In other words, the adjacent electrode is grounded before it can act to clear up the adverse condition which caused the short-circuit of the first electrode.

It is an object of this invention to provide a treater with a plurality of live electrodes so connected that the potential therebetween is greater than the potential between any of these electrodes and ground, and wherein a short-circuiting of one electrode decreases the potential previously present between this electrode and its adjacent electrode.

In accomplishing this and other results I have found it desirable to utilize a multi-stage alternating potential, and preferably a three-phase system. Such a system may include a transformer as a supply source, three high voltage secondary windings being provided, these windings being preferably connected in Y, with the neutral point connected to the tank of the dehydrator.

It is correspondingly an object of the invention to utilize a multi-stage alternating potential in the electric treatment of mixtures such as petroleum emulsion. With such a system the shorting out or grounding of one phase does not de-energize the whole system, but automatically adjusts the potential between the electrodes so as to clear up the adverse condition.

It is a further object of the invention to impress a multi-phase alternating potential across adjacent electrodes so that a plurality of fields are set up, each field being controlled by the instantaneous potential of one of the phases, and to move an emulsion to be treated successively through these fields.

By the use of three electrodes spaced with respect to each other and with respect to a fourth or grounded electrode it becomes possible to preliminarily treat the emulsion with a high potential to effect separation of the lighter phase. If the electrodes are properly formed, this lighter phase passes through an even more intense field between adjacent live electrodes. This tends to remove all traces of the heavier phases.

It is an object of the invention to provide a multi-phase electrode system in which one constituent of the emulsion is subjected to a high intensity field as it moves from the main treating space.

Further objects of the invention lie in the utilization of a three-phase transformer system in which the high tension windings are connected in Y and the low tension windings are connected in delta.

While still a further object of the invention lies in the utilization of a plurality of current-impeding devices, one in each conductor of the supply circuit.

Other features of the invention reside in the elecrode structures hereinafter to be described.

Further objects and advantages of the invention will be evident hereinafter.

Referring to the drawing in which one form of the invention is shown—

Fig. 1 is a sectional view of one form of treater.

Fig. 2 is a sectional view taken on the line 2—2 of Fig. 1.

Fig. 3 is a vectorial representation of the potentials involved.

Fig. 4 is a graphical representation of a three-phase potential such as may be employed.

The apparatus shown in Fig. 1 includes a tank 10 including a shell 11 closed at its upper and lower ends by upper and lower heads 12 and 13. Pipes 14 and 14a respectively communicate with the upper and lower ends of the tank to withdraw oil and water therefrom.

Extending across the tank 10 at a medial section is a horizontally disposed electrode 15 including a tube 16 depending centrally therefrom and into which the incoming emulsion is introduced through a pipe 17.

Supported above and in spaced relationship with the electrode 15 is a live electrode structure comprising primary, secondary, and tertiary live electrodes 18, 19, and 20 respectively. The tertiary live electrode 20 includes a shelf 21 and a depending flange 22, the shelf providing an opening 23. This electrode 20 is mounted on a supporting structure 24 suspended from an insulator 25 suitably attached to a rod 26 depending from the upper head 12.

The secondary live electrode 19 is positioned in the opening 23 of the tertiary live electrode 20 and provides a shelf 29 and a depending flange 30, the lower end of this flange being preferably flared outward as shown. A supporting structure 31 supports the secondary electrode and is in turn supported by an insulator 32 connected to the lower end of the insulator 25.

Positioned in an opening 35 of the secondary electrode 19 is the primary live electrode 18 which is in the form of an inverted cup and which includes a shelf 37 and a depending flange 38, the lower end of which is flared outward as shown. This primary live electrode is supported by an insulator 39 which is connected to the lower portion of the insulator 32. The result of such a structure is that the flanges of the primary, secondary, and tertiary live electrodes 18, 19, and 20 cooperate with the electrode 15 in defining a main treating zone including primary, secondary, and tertiary treating spaces 42, 43, and 44 respectively defined below the flanges 38, 30, and 22. The incoming emulsion tends to pass successively through these treating spaces, and any of the lighter material which separates therefrom either rises through an auxiliary treating space 45 formed between the flange 22 and the shell, as indicated by the arrow 46, or rises through one of two auxiliary treating spaces indicated by the numerals 47 and 48. The auxiliary treating space 47 is formed between the primary and secondary live electrodes 18 and 19, while the auxiliary treating space 48 is defined by the secondary and tertiary live electrodes 19 and 20. Any of the heavier material separating in any of the treating spaces moves along the electrode 15 and drops through one of a number of holes 49 formed near the periphery of the electrode 15.

The live electrodes 18, 19, and 20 are energized by a multi-phase potential-supply means indicated in general by the numeral 50. In the preferred embodiment this supply means is in the form of a transformer having primary windings 51, 52, and 53, and secondary windings 54, 55, and 56. The primary windings 51, 52, and 53 are preferably connected in delta to a supply source including conductors 57, 58, and 59. The secondary windings 54, 55, and 56 are preferably connected in Y so as to provide a neutral point 60 which is connected to the tank 10 and to the electrode 15 through ground. The remaining terminals of the secondary windings 54, 55, and 56 are respectively connected by conductors 63, 64, and 65 to the primary, secondary and tertiary live electrodes 18, 19, and 20 respectively. The conductors 63, 64, and 65 extend through corresponding insulators indicated in general by the numeral 66 of Fig. 1.

It will thus be apparent that energization of the supply means 50 will set up electric fields in the treating spaces 42, 43, and 44 as well as in the auxiliary treating space 45 and in the auxiliary treating spaces 47 and 48.

The magnitude of the potentials thus impressed across the different treating spaces may best be understood by Figs. 3 and 4. Fig. 4 represents a plot of a typical three-phase alternating potential and illustrates the relative intensity of the potential in the different phases at different instants of time. These phases are respectively indicated as phase 1, phase 2, and phase 3 and are displaced 120 electrical degrees from each other so that the peak potentials build up in succession across the treating spaces 42, 43, and 44 rather than building up simultaneously. Vectorially represented, these phases appear as shown in Fig. 3, the vector 101 representing the potential in phase 1, the vector 102 representing the potential in phase 2, and the vector 103 indicating the potential in phase 3, these potentials being the "effective potentials", and, of course, corresponding to the potentials induced in the secondary windings 54, 55, and 56. So also, these potentials are the potentials respectively setting up the fields in the primary, secondary, and tertiary treating spaces 42, 43, and 44. It will be understood, however, that the voltage across the auxiliary treating space 47 or 48 is of greater magnitude, being the vectorial sum respectively of the vectors 101 and 102, and 102 and 103, these latter vectors being indicated in Fig. 3 by the numerals 105 and 106 respectively. As the length of the vector 105 is 1.73 times the length of any of the vectors 101, 102 or 103 it follows that the potential across the auxiliary treating space 47 is 1.73 times as large as the potential across the treating spaces 42, 43, or 44. Similar remarks apply with regard to the potential across the auxiliary treating space 48.

When emulsion is being supplied through the pipe 17, this stream of emulsion is successively subjected to the fields in the treating spaces 42, 43, and 44. In the meantime, any dry or partially dry oil which tends to rise from the emulsion moves upward either through the auxiliary treating spaces 47 and 48 or through the auxiliary treating space 45. This oil usually carries small amounts of water, but it will be clear that as soon as this oil moves upward into the auxiliary treating spaces 47 or 48 it is subjected to a higher potential than present in the treating spaces 42, 43, and 44, thus tending to further agglomerate any water particles which might disperse therein. This rising oil must pass through the small upper portions of these auxiliary treating spaces defined by the shelves 21 and 29 in which the gradients are extremely high, thus completing the agglomeration of any dispersed particles which may still be in the rising oil.

The emulsion may be moved through the fields 42, 43, and 44 in quick succession, allowing only an incidental separation. On the other hand, this flow may be made correspondingly less so that a major portion of the dry oil moves upward through the auxiliary treating spaces 47 and 48 rather than around the primary electrode 20 and through the space 45. If the emulsion is moved through the treating spaces in quick sequence, it will be clear that it is subjected to electric fields which are out of phase with respect to each other, this action apparently subjecting the emulsion particles to additional stresses in a manner to assist agglomeration thereof.

It will be clear from the foregoing description that if short-circuiting chains should form, for instance across the primary treating space 42, the potential between the primary electrode 18 and the electrode 15 will be reduced to substantially zero. In other words, the secondary winding 54 of the transformer will be grounded. This will have the desirable effect of decreasing the potential across the supplementary treating space 47, for this potential will be reduced to the potential developed by the secondary winding 55, and will be of a magnitude indicated by the vector 102 of Fig. 3. This is a desirable action in view of the fact that if such a short-circuiting across the treating space 42 should take place, it would be due in all probability to an excessive amount of moisture in the oil at this section. Reducing the potential across the supplementary treating space 47 thus supplies a reduced potential which will compensate for the additional moisture in any oil moving therethrough and thus tends to clear up the short-circuiting condition.

Thus, one of the features of this treater is that short-circuiting of one of the electrodes will reduce the adjacent potential so as to clear up the adverse condition. In addition, a short-circuit will not shut down the treater, and in many cases the reduced potential will clear up the condition so that no manual adjustment is necessary. Even under the most adverse conditions it will be clear that the treating spaces would short-circuit in succession rather than simultaneously, thus giving a greater opportunity for the adverse condition to be eliminated.

A multi-phase system is also advantageous in view of the fact that increased currents across one of the treating spaces 42, 43, and 44 is reflected in several phases of the supply means 50. With the particular connection shown, an increase in current through any of the conductors 63, 64, or 65 develops increased current in two of the conductors 57, 58, or 59.

By positioning choke coils or other impedance means in each of the conductors 57, 58, and 59, as indicated by the numeral 110 of Fig. 1, further advantages are obtained, these choke coils acting to choke back the excessive flow of current in the conductors 57, 58, and 59. When these choke coils are positioned as shown, short-circuiting of one of the phases will cause an additional voltage drop across the remaining phases which will in turn decrease the voltage supplied to the remaining treating spaces in the treater. This desirable result is not obtained if the choke coils are positioned in the conductors 63, 64, and 65, and it is an important feature of the invention to utilize such choke coils or other impedance means in the supply conductors 57, 58, and 59.

I am not limited to the particular connection of the supply means 50 illustrated in Fig. 1, though it is usually desirable to use a three-phase system and connect the secondary of the three-phase system in Y, as shown, the neutral point being connected to the tank and thus to the electrode 15. Other multi-phase systems are, however, possible and fall within the scope of this invention.

I claim as my invention:

1. A method of treating an emulsion by the use of a plurality of electrodes, which method includes the steps of: impressing a multi-phase potential across said electrodes to establish electric fields therebetween which successively build up to peak values; subjecting said emulsion to the action of said electric fields whereby one phase of said emulsion tends to separate; and subjecting said one phase to an electric field which is the vectorial sum of the potential between two of said phases, which vectorial sum is greater than the peak voltage of either of said phases whereby said one phase is subjected to further treatment.

2. In an apparatus for treating an emulsion, the combination of: three live electrodes spaced from each other to define auxiliary treating spaces therebetween; a fourth electrode spaced from said three live electrodes to define a main treating space communicating with said auxiliary treating spaces; a multi-phase potential-supply means connected to said three live electrodes and to said fourth electrode to set up fields in said treating spaces, the field in said main treating space being less intense than the fields in said auxiliary treating spaces; and means for flowing said emulsion into said main treating space, at least a portion thereof subsequently moving through said auxiliary treating spaces.

3. In an apparatus for treating an emulsion, the combination of: a horizontally disposed electrode; three live electrodes spaced from each other to define auxiliary treating spaces disposed above said horizontally disposed electrode and cooperating therewith in defining main treating spaces communicating with said auxilary treating spaces; means for insulating said live electrodes from each other and from said horizontally disposed electrode; means for supplying emulsion to said treating spaces; a three-phase potential-supply means; and means for individually connecting said three electrodes to the three phases of said potential-supply means whereby the potential between any one of said electrodes and said horizontally disposed electrode is equal to the potential developed by that phase to which said one of said electrodes is connected and whereby the potential across the space between two adjacent live electrodes is equal to the vectorial sum of the potentials developed by the phases to which these two adjacent live electrodes are connected, a portion of said emulsion being first acted upon in said main treating spaces and then rising through said auxiliary treating spaces.

4. A combination as defined in claim 3 in which said potential-supply means comprises three windings connected in Y in a manner to provide a neutral point, and in which said neutral point is electrically connected to said horizontally disposed electrode.

5. In an apparatus for treating an emulsion, the combination of: a tank; a plurality of live electrodes supported in said tank and insulated from each other; multi-phase potential-supply means connecting said electrodes and building up fields therebetween which are out of phase with respect to each other; a multi-phase supply source connected to the multi-phase potential-supply means and comprising a plurality of conductors for delivering current thereto; and impedance means in each of said conductors limiting the current supply through any of these conductors.

6. In an apparatus for treating an emulsion, the combination of: three live electrodes spaced from each other to define auxiliary treating spaces therebetween; a fourth electrode spaced from said three live electrodes to define a main treating space communicating with said auxiliary treating spaces; a three-phase potential-supply means including three high tension windings connected in Y; means electrically connecting the neutral point of said Y connection to said fourth electrode; means for electrically connecting each of said windings to one of said three live electrodes whereby the potential across the space between any two of said live electrodes is equal to the vectorial sum of the potentials across two of said windings and the potential between any of said live electrodes and said fourth electrode is equal to the potential across one of said windings; and means for subjecting an emulsion to the action of said electric fields.

7. In an apparatus for treating an emulsion, the combination of: a plurality of live electrodes insulated from each other; emulsion-introduction means for delivering an emulsion to the spaces between said electrodes; a three-phase potential-supply means including three windings connected in Y; means electrically connecting the neutral point of said Y connection to said emulsion-introduction means; and means for connecting said live electrodes to said three windings whereby the potential between adjacent live electrodes equals the vectorial sum of the potentials across two of said windings and the potential between said emulsion-introduction means and said live electrodes equals the potential across one of said windings.

8. A method of treating an emulsion by the use of a multi-phase alternating potential, which method includes the steps of: setting up an electric field the potential across which varies in response to the potential of one of said phases; setting up an electric field the potential across which varies in response to the vectorial sum of the potentials of two of said phases; and successively subjecting an emulsion to said electric fields.

9. A method of treating an emulsion to coalesce the dispersed phase thereof, which method includes the steps of: establishing a first electric field of alternating character by the use of one phase of a multi-phase alternating potential; establishing a second electric field of alternating character adjacent said first field and by the use of another phase of said multi-phase alternating potential out of phase with the potential used in establishing said first electric field, whereby the potentials across said fields are substantially equal to the phase potentials and whereby the gradients in said fields reach peak values at different instants of time said fields being of sufficient intensity to coalesce the dispersed phase of said emulsion; and subjecting the emulsion to be treated to the action of said fields.

10. A method of treating an emulsion to coalesce the dispersed phase thereof, which method includes the steps of: establishing a first electric field of alternating character by the use of one phase of a multi-phase alternating potential; establishing a second electric field of alternating character adjacent said first field and by the use of another phase of said multi-phase alternating potential out of phase with the potential used in establishing said first electric field, whereby the potentials across said fields are substantially equal to the phase potentials and whereby the gradients in said fields reach peak values at different instants of time said fields being of sufficient intensity to coalesce the dispersed phase of said emulsion; establishing a third electric field by the use of both of said alternating potentials and of a magnitude represented by the vectorial sum of said alternating potentials; and subjecting the emulsion to be treated to the action of said fields.

11. A method of treating an emulsion to separate the liquid of the dispersed phase from the liquid of the continuous phase, which method includes the steps of: establishing a first electric field in a first treating space by impressing thereacross an alternating potential; establishing a second electric field in a second treating space adjacent said first treating space by impressing across said second treating space an alternating potential out of phase with the alternating potential across said first treating space, said fields being respectively established by the use of two phases of a multi-phase potential and being of sufficient magnitude to coalesce the particles forming the dispersed phase of said emulsion; successively subjecting the emulsion constituents to the action of said electric fields; and separating a portion of the coalesced particles from the remainder of the emulsion constituents before these constituents move into said second electric field.

12. In an apparatus for treating an emulsion to coalesce the dispersed phase thereof, the combination of: a tank; a plurality of electrodes positioned in said tank and insulated from said tank and from each other; a multi-phase potential-supply means; means for connecting each phase to one of said electrodes in said tank whereby the potential difference between said electrodes is equal to the vectorial sum of the phase potentials impressed across these said electrodes; means for grounding said tank to establish a potential difference between said tank and each of said electrodes which potential difference is equal to the potential of one phase of said multi-phase potential-supply means; and means for delivering the emulsion to be treated to said tank, said potential difference between said electrodes being sufficiently high to coalesce the dispersed phase of said emulsion.

13. A combination as defined in claim 12 in which three electrodes are used, and in which said multi-phase potential-supply means includes a transformer with three windings connected in Y to provide a neutral point, and in which said neutral point is electrically connected to said tank.

14. In an apparatus for treating an emulsion to coalesce the dispersed phase thereof, the combination of: three electrodes insulated from each other; a transformer providing three primary windings connected in delta and three secondary windings connected in Y; means for connecting each of said Y-connected secondary windings to one of said electrodes whereby the potential difference between two of said electrodes is equal to the vectorial sum of the potentials across corresponding secondary windings of said transformer; means for delivering emulsion to the fields established by said electrodes; a three-phase supply source including three conductors connected to said delta-connected primary windings; and impedance means in circuit with each of said conductors.

15. In an apparatus for treating an emulsion to coalesce the dispersed phase thereof, the combination of: a tank; three electrodes in said tank and insulated from each other; a transformer providing three primary windings connected in delta and three secondary windings connected in Y to provide a neutral point; means for connecting each of said Y-connected secondary windings to one of said electrodes whereby the potential difference between two of said electrodes is equal to the vectorial sum of the potentials across corresponding secondary windings of said transformer; means for connecting said neutral point of said Y-connected secondary windings to said tank whereby a potential difference is set up between said tank and each of said electrodes substantially equal to the potential of said secondary windings individually; and means for delivering emulsion to the fields established by said electrodes.

LOUIS E. McDONALD.